(12) United States Patent
Baughman et al.

(10) Patent No.: US 11,782,770 B2
(45) Date of Patent: Oct. 10, 2023

(54) RESOURCE ALLOCATION BASED ON A CONTEXTUAL SCENARIO

(71) Applicant: International Business Machines Corporation, Armonk, NY (US)

(72) Inventors: Aaron K. Baughman, Cary, NC (US); Shikhar Kwatra, San Jose, CA (US); Jennifer L. Szkatulski, Rochester, MI (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 17/109,386

(22) Filed: Dec. 2, 2020

(65) Prior Publication Data

US 2022/0171665 A1 Jun. 2, 2022

(51) Int. Cl.
| | | |
|---|---|---|
| G06F 9/46 | (2006.01) | |
| G06F 9/50 | (2006.01) | |
| G06N 20/00 | (2019.01) | |
| G06N 5/04 | (2023.01) | |

(52) U.S. Cl.
CPC ............ *G06F 9/5094* (2013.01); *G06N 5/04* (2013.01); *G06N 20/00* (2019.01); *G06F 2209/503* (2013.01)

(58) Field of Classification Search
CPC . G06F 9/5094; G06F 2209/503; G06N 20/00; G06N 5/04
See application file for complete search history.

(56) References Cited

U.S. PATENT DOCUMENTS

| | | |
|---|---|---|
| 8,195,340 B1 | 6/2012 | Haney |
| 10,128,684 B2 | 11/2018 | Ramamurthy |
| 10,234,833 B2 | 3/2019 | Ahuja |
| 2018/0082224 A1 | 3/2018 | Leslie |
| 2018/0217650 A1 | 8/2018 | Elizov |
| 2020/0241917 A1 | 7/2020 | Chen |

FOREIGN PATENT DOCUMENTS

| | | |
|---|---|---|
| CN | 114595055 A | 6/2022 |
| DE | 102021130359 A1 | 6/2022 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Gregory A Kessler
(74) *Attorney, Agent, or Firm* — Kulsoom Hasan; Heather Johnston

(57) ABSTRACT

A processor may analyze, using an AI system, an application, where the application includes one or more application modules. The processor may determine, using the AI system, that an application module is critical based on a contextual scenario. The AI system may be trained utilizing data regarding heat generation of hardware on which the application module is operating. The processor may identify, using the AI system, required resources of the hardware for the application module to function during the contextual scenario. The processor may allocate an availability of the required resources for the application module.

20 Claims, 5 Drawing Sheets

(56) References Cited

OTHER PUBLICATIONS

Foreign Search Report, Patents Act 1977: Combined Search Report under Sections 17 and 18(3), Application No. GB2116549.3, dated Jul. 5, 2022.

Witt et al., "Feedback-Based Resource Allocation for Batch Scheduling of Scientific Workflows", 2019 International Conference on High Performance Computing & Simulation (HPCS), IEEE, 8 pages.

RESOURCE ALLOCATION BASED ON A CONTEXTUAL SCENARIO

BACKGROUND

The present disclosure relates generally to the field of resource allocation, and more specifically to allocating resources for critical application modules based on a contextual scenario.

Computing in the cloud, on datacenters, or on edge devices requires computational resources and power. These resources can be drained if an edge device, such as a mobile phone or an internet-of-things connected device, or a datacenter is low on power or the computational resources required are high. Ameliorative action can be taken under such circumstances.

SUMMARY

Embodiments of the present disclosure include a method, computer program product, and system for allocating resources for critical application modules based on a contextual scenario.

A processor may analyze, using an AI system, an application, where the application includes one or more application modules. The processor may determine, using the AI system, that an application module is critical based on a contextual scenario. The AI system may be trained utilizing data regarding heat generation of hardware on which the application module is operating. The processor may identify, using the AI system, required resources of the hardware for the application module to function during the contextual scenario. The processor may allocate an availability of the required resources for the application module.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
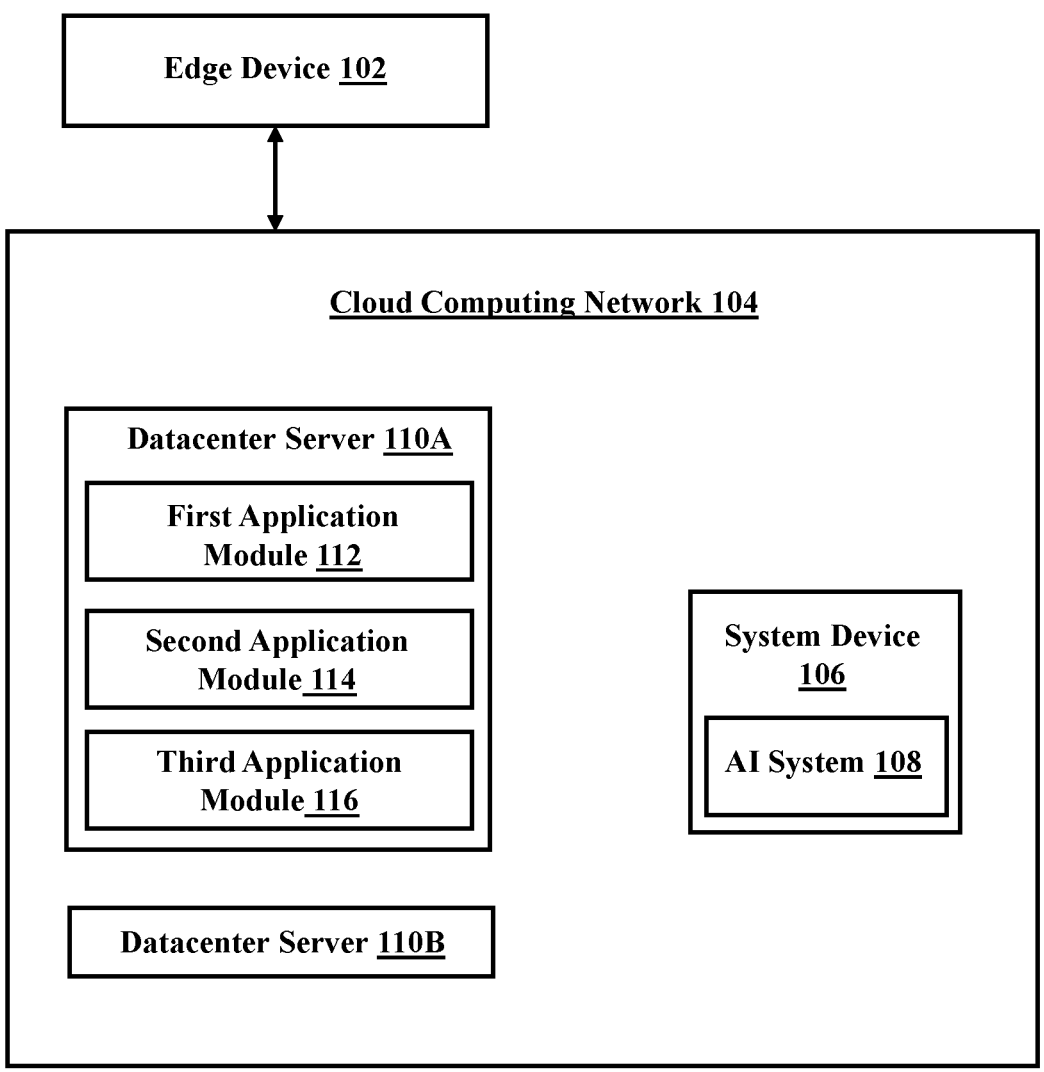
FIG. 1 is a block diagram of an exemplary system for allocating resources for critical application modules, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of resource allocation, and more specifically to allocating resources for critical application modules based on a contextual scenario. While the present disclosure is not necessarily limited to such applications, various aspects of the disclosure may be appreciated through a discussion of various examples using this context.

Computing in the cloud, on datacenters, or on edge devices requires computational resources and power. These resources can be drained if an edge device, such as a mobile phone or an internet-of-things connected device, or a datacenter is low on power or the computational resources required are high. Datacenters can host the critical infrastructure of an organization; however, datacenters can be affected by grid failures caused by natural calamity, mechanical failure, electrical failure, etc. The present disclosure is directed to identifying critical business functionalities of different applications and ensuring the functionalities are available when power or computational resources are limited.

In some embodiments, a processor may analyze, using an artificial intelligence ("AI") system, an application. In some embodiments, the application may include one or more application modules. In some embodiments, the processor may determine that an application module is critical based on a contextual scenario. In some embodiments, the one or more application modules may be components of an application that have an output and perform a function. In some embodiments, the contextual scenario may relate to circumstances of the use of the application module and may include date, time of day, geographic location, tags regarding the owners of the application, tags providing specific instructions from the owners or users of the application, etc. In some embodiments, the contextual scenario may relate to conditions that are specific to the application and the functions it performs, the manner in which the application is used, the users/enterprise for whom the application is run, etc. In some embodiments, the contextual scenario may relate to circumstances that are not specific to the application, including, for example, an occurrence (e.g., power outage) at a datacenter on which the application is run, demands on power or computational resources at the datacenter on which the application is run from other applications and other users, a particular event (e.g., the occurrence of a historical event, natural disaster, or a noteworthy cultural event) relating to use of the application or availability of the resources, etc. In some embodiments the criticality of the application module is determined based on usage patterns of the application module. In some embodiments, the criticality of an application modules is determined based on input by the users of the application module.

For example, the AI system may be analyzing one or more application modules of a human resources ("HR") department payroll application that is used by a business to administer the payroll for its employees. Closer to the end of the month when employees receive their pay, the payroll application may be in high volume use. The AI system may determine that, during the end of the month contextual scenario, an application module which is involved in direct depositing paychecks (e.g., affecting many of the employees on the payroll) is a critical application module, whereas an application module which verifies a secondary phone number for new employees (e.g., may affect fewer employees and is less directly related to the end of the month pay cycle) is not a critical application module.

In some embodiments, the AI system may be trained utilizing data regarding heat generation of hardware on which the application module is operating. In some embodiments, the AI system may cluster application modules, based on an identified contextual scenario, using historical heat generation patterns of each application module. For example, using infrared or temperature sensors, the heat generated by hardware on which the application module is operating (e.g., a datacenter rack or CPU on a laptop computer) may be monitored. The time, date, and other circumstances surrounding usage (e.g., information regarding the contextual scenario) may also be monitored and utilized during training of the AI system. In some embodiments, the AI system may cluster application modules as critical application modules based on patterns of parallel upkeep and operation in a contextual situation.

As an example, sensors installed in a datacenter may detect heat generated by different units (e.g., datacenter modules/racks) and correlate the units with duration of usage, number of processing units, volume of data movement, number of users performing parallel requests, etc. From this information, the AI system may interpolate how many datacenter units may be generating heat when the critical application module is operating.

In some embodiments, the AI system may be trained to identify contextual scenarios utilizing historical data about various modules (e.g., functionalities) of different applications in an enterprise. The historical data may be utilized to predict the criticality of various modules or functionalities of the application that should be upkept and running for any identified contextual situation. The historical data may include traffic pattern trends, day/time data streams (e.g., at the end of the month a salary processing module of a human resources department application needs to be upkept), application usage, departmental usage metrics (e.g., the human resources department has data on how often the particular application is used and when it is most needed for department operations), different times when an application module is used, duration of use of the different modules, the number of concurrent users of the application or its module, how the application module is used in the workflow of other modules (e.g., tasks of the different application modules may need to be performed in parallel or in sequence without a large time gap), data flow directions from one application module to another application module, impact of lack of operation of the application module on the enterprise (e.g., business needs, financial repercussions, operational repercussions), etc.

In some embodiments, the AI system may be trained utilizing historical data capturing the usage log of each and every module of different applications. In some embodiments, the AI system may be trained to identify critical applications based on usage patterns during contextual scenarios, based on user feedback, or based on scheduling requirements for the hardware on which the application module is run (e.g., the application module may perform a very compute intensive task and may be run on several servers on a server rack on which an enterprises' applications are run from 9 am until 5 pm, therefore making the running of the compute intensive application module prior to 9 am critical).

In some embodiments, the AI system may be trained utilizing unsupervised learning. In some embodiments, the AI system may be trained utilizing supervised learning. In some embodiments, modules may be tagged to identify their functions and contextual situations in which their functions are critical. In some embodiments, the AI system may be trained to predict contextual situations during which an application module may be critical using means-shift clustering techniques. Means-shift clustering techniques may be used to determine when different application modules are used, which datacenter modules (e.g., datacenter racks or units) are used for the application modules, the duration of use of the different application modules, the number of processing units required for different application modules, etc.

Continuing the previous example, using historical data, the AI system may be trained to identify the end of the month contextual scenario and that the paycheck direct deposit application module of the HR department payroll application is critical for the business at that time. The AI system may determine that the paycheck direct deposit application module is critical based, at least in part, on historical heat generation patterns of the hardware on which the application module is run that provide an indication of the usage patterns of the application module. The AI system may determine that other application modules of the HR department payroll application are related to the critical functions of the application at the end of the month based on usage patterns determined, at least in part, based on heat generation patterns of the hardware on which the other application modules are run. In some embodiments, the AI system may be trained to identify contextual scenarios (e.g., a user has specific resource needs under certain circumstances) and determine whether resources (e.g., hardware, such as one server rack in a datacenter) are predicted to be in use in the future based on anticipated workloads.

In some embodiments, the processor may identify, using the AI system, required resources of the hardware for the application module to function during the contextual scenario. In some embodiments, the required resources may include the power required for the application module (e.g., the application module determined to be critical) to run. In some embodiments, the required resources may include computational resources (e.g., CPU, GPU) required for the application module to run. In some embodiments, the required resources may include power or computational resources required for other application modules whose functioning (e.g., operationality) is related to (e.g., necessary for) the functioning of the application module determined to be critical.

In some embodiments, the AI system may analyze the historical usage patterns of various application modules and may analyze their power requirements to keep the critical application module up and running (e.g., operating). In some embodiments, the predicted power requirements may be based on contextual information collected (e.g., time, date, pattern of usage). In some embodiments, the AI system may analyze the power requirements for cooling the hardware on which the application module is operating and may analyze data regarding contextual scenarios associated with the cooling. In some embodiments, the AI system may be trained using data regarding energy disbursement and energy consumption. In some embodiments, metered usage data may be obtained directly from the power appliances and the consumption devices.

In some embodiments, the optimum power required may be calculated as a minimal baseline level for functionality so that additional power may be allocated to all other required elements. In some embodiments, the baseline level may be continually monitored and adapted based on contextual information collected (e.g., time, date, pattern of usage).

As an example, the AI system may interpolate the power required for each module (e.g., server unit or rack) in a datacenter. The power required for each datacenter module may be determined based on the duration of running, the number of processing units, raw data provided by the operating system about CPU usage, processing power, API call usage, a breakdown of the overall power consumption, etc. The data regarding power requirements may be correlated with information regarding the contextual scenario, including, time data, data regarding the functionality of the datacenter modules, geographical location, and tagged needs (e.g., needs specified by the entity using or owning the application).

In some embodiments, the processor may allocate an availability of the required resources for the application module. In some embodiments, the processor may take ameliorative action to ensure that the allocated resources are available to the application module. For example, if the critical application module requires 3 watts of power to run long enough to complete its function and a non-critical application module requires 2 watts to complete its function when there is only a total of 4 watts of power available, the hardware running the non-critical application module may be made non-operational (e.g., shut off, put in sleep mode, receive little to no power). In some embodiments, the processor may send an application module to run on another device (e.g., another server of a datacenter, the cloud, the fog, or an edge device) to ensure the availability of required resources for critical application modules.

For example, a non-critical application module may be running on a first server of a datacenter on backup power, and the non-critical application module may be pushed to another server to leave enough power for the critical application module running on the first server. As another example, the critical application module may be pushed to the cloud, another datacenter server, or to an edge device. In some embodiments, the ameliorative action to ensure that the critical application module has the required resources may depend on the contextual scenario and the resources (e.g., power, computational resources) available on the devices (e.g., datacenter server, cloud, or edge device). For example, a critical application module may not be pushed from a datacenter server with limited backup power to a second datacenter server if it is predicted that the second datacenter server will have its power and computational resources fully utilized by future work scheduled to be performed on the second datacenter server. In some embodiments, for applications having a microservices architecture, the application modules may be streamlined, converted to minimal systems, and combined into fewer physical equipment to reduce power needs.

In some embodiments, determining that the application module is critical based on the contextual scenario may include identifying each of the one or more application modules that are accessed during the contextual scenario. In some embodiments, the processor may identify that the application module was accessed more than an access threshold amount. For example, the contextual scenario may include the first two hours of the work week for a particular business. The contextual scenario may be associated with a date, time, and certain applications and application modules labeled as belonging to the particular business. The processor may identify each and every application module of the application modules labeled as belonging to the business that are accessed by any user during the two hour period. In some embodiments, the application modules may be identified by the AI system as belonging to the particular business. In some embodiments, the application modules may be identified as belonging to the particular business based on data provided by the particular business (e.g., the application modules may be prelabeled by the particular business). Continuing the example, the processor may determine that an application module that grants a user access to email is a critical application module if the application module was accessed, during the contextual scenario (e.g., the two hour period), a greater number of times than a threshold number of times.

In some embodiments, allocating an availability of the required resources for the application module may include identifying a second critical application module. In some embodiments, the processor may rank a priority of the second critical application module above a priority of the application module. For example, the second critical application module may be identified by the AI system based on the number of times the second critical application module was accessed during a contextual scenario. For example, the second critical application module may have been accessed a greater number of times than the access threshold amount. In some embodiments, the priority of the second critical application module may be determined based on the number of times that the second critical application module was accessed being greater than the number of times the application module was accessed. In some embodiments, the priority of the second critical application may be ranked above the priority of the application module based on user feedback (e.g., the ranking of the priority was provided by means of tagged input into the AI system).

In some embodiments, the processor may detect a workflow of the application. In some embodiments, the processor may identify, from detecting the workflow of the application, an additional application module in the workflow sequence. In some embodiments, the processor may identify required resources for the additional application module. In some embodiments, the processor may allocate a second availability of required resources for the additional application module.

For example, the processor may detect that an additional application module performs a task that is to be completed before the task that the critical application module performs can be initiated and within a certain timeframe (e.g., by checking API calls it be may be determined that additional application module has a call to the critical application module and then the critical application module starts to run within a few minutes). The processor may determine that the additional application is in the workflow of the critical application module. The AI system may be utilized to determine the required resources for the additional application module (e.g., the power or computational resources it needs to run). The processor may allocate a second availability of required resources for the additional application module. The required resources may be allocated to the additional application module by shutting down other application modules, saving on required resources in other ways, or pushing the critical application module and/or the additional application module to a different device (e.g., datacenter server, edge device, or the cloud).

In some embodiments, a workflow of a critical application may include processes (and their application modules) which run in sequence (e.g., within a close time sequence) or parallel to the critical application. In some embodiments, a workflow of the critical application module may include processes that are determined to run along with the critical application module based on their usage patterns (e.g., detection of heat generation by hardware running the processing and/or based on clustering of similar processes) occurring in a related usage pattern (e.g., run for same duration, same time, immediately following, etc.) to the critical application.

In some embodiments, the additional application module may include a specific activity in the workflow. In some embodiments, the additional application module may be shut down after the specific activity in the workflow is completed. For example, the additional application may perform the specific activity of checking the security level of an internet connection before connecting a device to secure applications of a business, including secure email accounts. In some embodiments, after the security level of the internet connection is checked, the additional application may be shut down to preserve power or computational resources.

In some embodiments, the processor may identify that a datacenter for running the application module and the additional application module is operating using backup power. In some embodiments, the application module and the additional application module may be processed on modules of the datacenter. In some embodiments, the modules of the datacenter may be transferred, physically, in proximity to each other. For example, when the application module and the additional application module are being processes on modules of a datacenter (e.g., servers on server racks or units of the datacenter), and the datacenter has limited power resources (e.g., due to a power outage), the processor may evaluate how to allocate the limited power resources of the datacenter to the critical application module and the additional application module. If the application module is being processed on a different datacenter module than the datacenter module on which the additional application module is being processed, the different datacenter modules may be physically transferred to be in proximity to each other. By physically transferring the datacenter modules to be in proximity to each other, power resources used to cool the datacenter modules may be utilized more efficiently. In some embodiments, the datacenter modules may be mobile, either self-moving or movable by a robotic system.

In some embodiments, the processor may predict a duration of use of the backup power. In some embodiments, the duration of the backup power may be predicted using the AI system. In some embodiments, the AI system may be trained utilizing data regarding causes of power outages (e.g., mechanical failures, electrical failures, natural disasters, etc.) and data regarding the time for remediation/restoration of power. In some embodiments, the available backup power may be determined repeatedly and/or in regular time intervals.

In some embodiments, based on the amount of backup power available, the criticality of an application module may be evaluated. In some embodiments, power may be given to some critical application modules before other critical application modules as the criticality of application modules is compared and prioritized. In some embodiments, the AI system may analyze and determine contextual scenarios during which resources (e.g., power or processing resources) may be limited. This may be, for example, at the beginning of the month, at the end of the month, during the timeline for an annual budget. In some embodiments, the AI system may provide predictions regarding usage restrictions (e.g., due to limited resources) and usage needs may be calculated and accommodated for as necessary.

Referring now to FIG. 1, a block diagram of a system 100 for allocating resources for critical application modules is illustrated. System 100 includes an edge device 102 and a cloud computing network 104. The cloud computing network 104 includes a system device 106 on which an AI system 108 operates. The cloud computing network 104 also includes datacenter server 110A and datacenter server 110B. The edge device 102, system device 106, datacenter server 110A, and datacenter server 110B are configured to be in communication with each other. The edge device 102 and the system device 106 may be any devices that contain a processor configured to perform one or more of the functions or steps described in this disclosure.

In some embodiments, a processor of the system device 106 analyzes an application running on datacenter server 110A. In some embodiments, the application includes one or more application modules (including first application module 112, second application module 114, and third application module 116). The processor determines, using the AI system 108, that an application module of the one or more application modules (e.g., first application module 112) is critical base on a contextual scenario. The AI system determines that first application module 112 is critical, at least in part, based on the heat generation of hardware on which first application module 112 runs. Sensors (not illustrated) on the datacenter server 110A, datacenter server 110B, and the edge device 102, provide sensor data regarding heat generation of hardware on those devices to the AI system 108. The processor identifies required resources of the hardware for first application module 112 to function during the contextual scenario. The processor allocates an availability of the required resources for the application module.

In some embodiments, the processor may take ameliorative action to ensure that the allocated resources are available to first application module 112. For example, non-critical application modules operating on datacenter server 110A may be shut off. First application module 112 may be pushed from datacenter server 110A to datacenter server 110B or the edge device 102 if resources are available on datacenter server 110B or the edge device 102 for the critical application module.

In some embodiments, the processor may determine that first application module 112 is critical based on the contextual scenario by: identifying, during the contextual scenario, each of the one or more application modules that are accessed and identifying the application modules accessed more than an access threshold amount. In some embodiments, the processor may, utilizing AI system 108, identify a second critical application module, e.g., second application module 114 operating on datacenter server 110A. In some embodiments, the processor may rank the priority of the second application module 114 to receive required resources (e.g., power or computational resources) as higher than the priority of the first application module 112.

In some embodiments, the processor may detect a workflow of the application and identify an additional application module, e.g., third application module 116, in the workflow. In some embodiments, the processor may identify required resources for the third application module 116 and allocate a second availability of required resources for the third application module 116. In some embodiments, the third application module 116 may include a specific activity in the workflow. In some embodiments, the processor may shut down the third application module 116 after the specific activity in the workflow is complete.

In some embodiments, the processor may identify that datacenter server 110A, for processing the first application module 112, the second application module 114, and the third application module 116, is operating using backup power. The datacenter modules (e.g., units or racks) on which the first application module 112, the second application module 114, and the third application module 116 are running may be transferred, physically, to be in proximity to each other.

Figure 2:
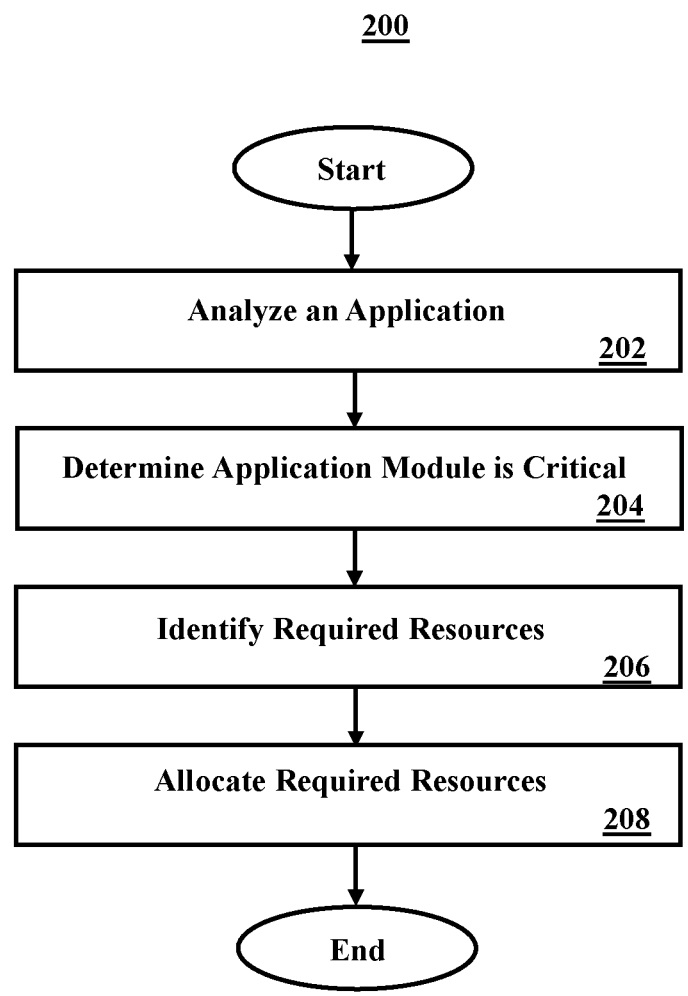
FIG. 2 is a flowchart of an exemplary method for allocating resources for critical application modules, in accordance with aspects of the present disclosure.

Referring now to FIG. 2, illustrated is a flowchart of an exemplary method 200 in accordance with embodiments of the present disclosure. In some embodiments, a processor of the AI system may perform the operations of the method 200. In some embodiments, method 200 begins at operation 202. At operation 202, the processor analyzes, using an AI system, an application, where the application includes one or more application modules. In some embodiments, method 200 proceeds to operation 204, where the processor determines, using the AI system, that an application module is critical based on a contextual scenario. In some embodiments, the AI system is trained utilizing data regarding heat generation of hardware on which the application module is operating. In some embodiments, method 200 proceeds to operation 206. At operation 206, the processor identifies, using the AI system, required resources of the hardware for the application module to function during the contextual scenario. In some embodiments, method 200 proceeds to operation 208. At operation 208, the processor allocates an availability of the required resources for the application module.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
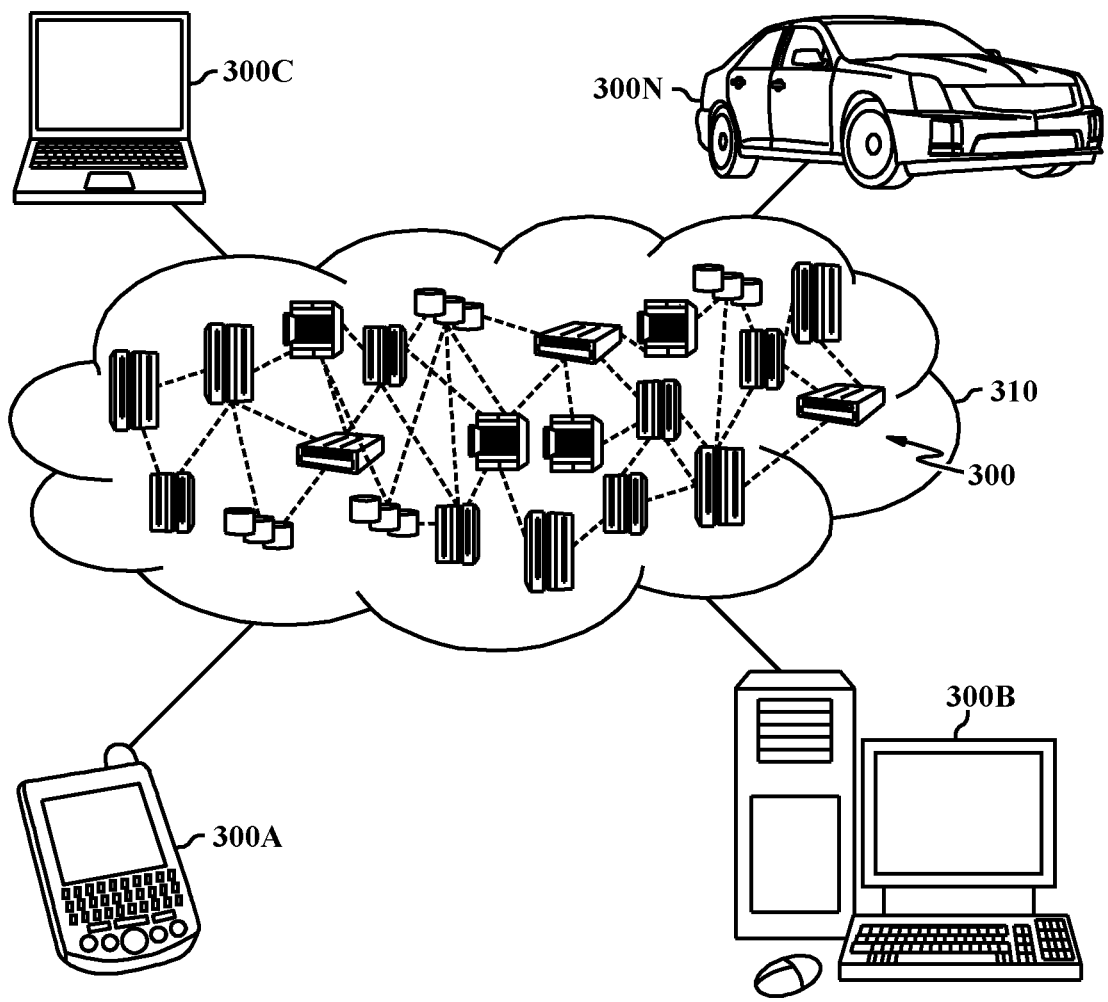
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
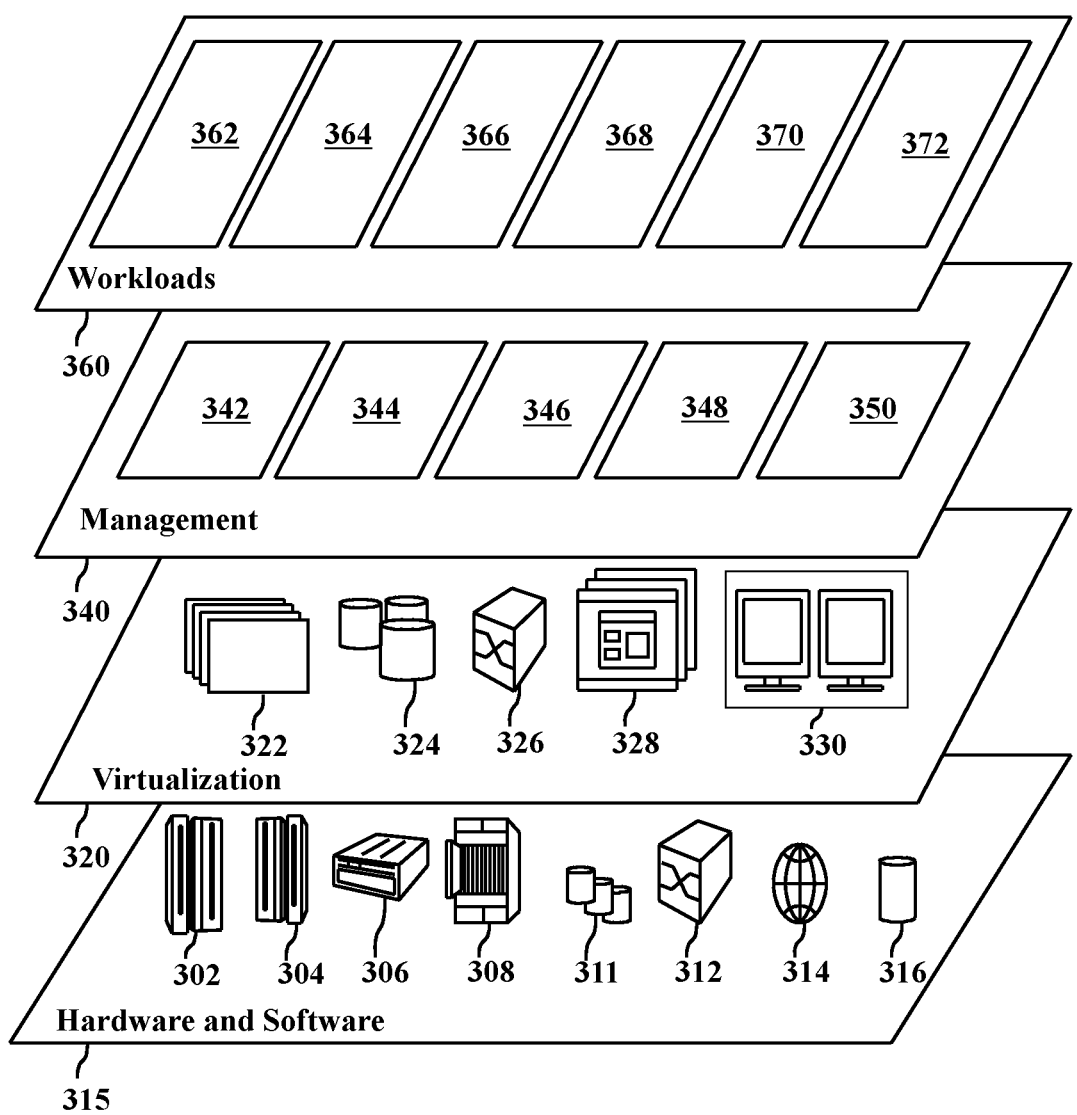
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and allocating resources for critical application modules based on a contextual scenario 372.

Figure 4:
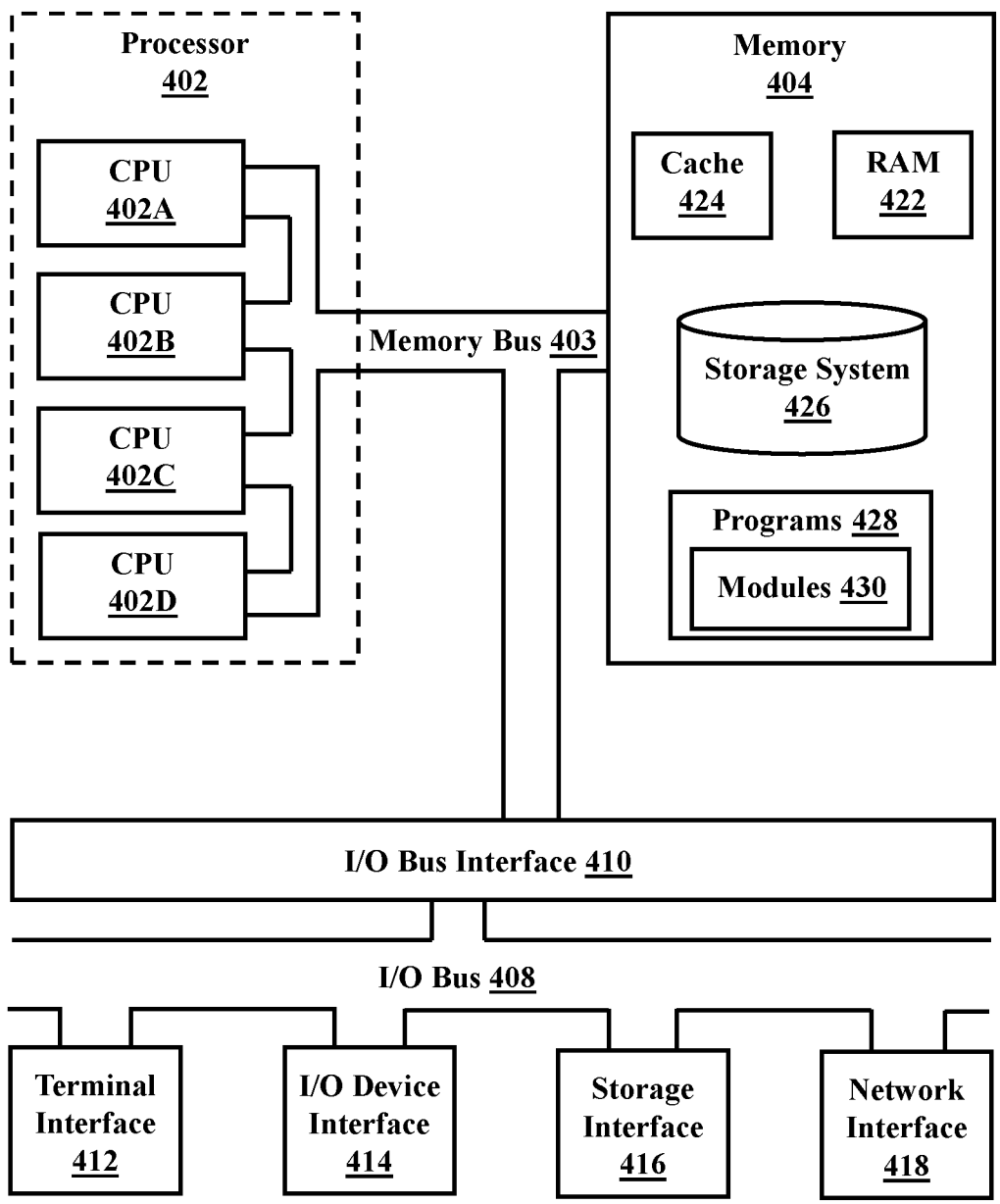
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
    analyzing, using an AI system, an application, wherein the application includes one or more application modules;
    determining, using the AI system, that an application module is critical based on a contextual scenario, wherein the AI system is trained utilizing data regarding heat generation of hardware on which the application module is operating;
    identifying, using the AI system, required resources for the hardware for the application module to function during the contextual scenario; and
    allocating an availability of the required resources for the application module.

2. The method of claim 1, wherein determining that the application module is critical based on the contextual scenario includes:
    identifying, during the contextual scenario, each of the one or more application modules that are accessed; and
    identifying that the application module was accessed more than an access threshold amount.

3. The method of claim 2, wherein allocating an availability of the required resources for the application module includes:
    identifying a second critical application module; and
    ranking a priority of the second critical application module above a priority of the application module.

4. The method of claim 1, further comprising:
    detecting a workflow of the application;
    identifying, from the detecting, an additional application module in the workflow;
    identifying required resources for the additional application module; and
    allocating a second availability of required resources for the additional application module.

5. The method of claim 4, wherein the additional application module includes a specific activity in the workflow, and wherein the method further comprises:
    shutting down the additional application module after the specific activity in the workflow is complete.

6. The method of claim 4, further comprising:
    identifying that a datacenter for running the application module and the additional application module is operating using backup power; and
    transferring, physically, modules of the datacenter in proximity to each other, wherein the application module and the additional application module are being processed on the modules of the datacenter.

7. The method of claim 6, further comprising:
    predicting a duration of use of the backup power.

8. A system comprising:
    a memory; and
    a processor in communication with the memory, the processor being configured to perform operations comprising:
    analyzing, using an AI system, an application, wherein the application includes one or more application modules;
    determining, using the AI system, that an application module is critical based on a contextual scenario, wherein the AI system is trained utilizing data regarding heat generation of hardware on which the application module is operating;
    identifying, using the AI system, required resources for the hardware for the application module to function during the contextual scenario; and
    allocating an availability of the required resources for the application module.

9. The system of claim 8, wherein determining that the application module is critical based on the contextual scenario includes:
    identifying, during the contextual scenario, each of the one or more application modules that are accessed; and
    identifying that the application module was accessed more than an access threshold amount.

10. The system of claim 9, wherein allocating an availability of the required resources for the application module includes:
    identifying a second critical application module; and
    ranking a priority of the second critical application module above a priority of the application module.

11. The system of claim 8, the processor being further configured to perform operations comprising:
    detecting a workflow of the application;
    identifying, from the detecting, an additional application module in the workflow;
    identifying required resources for the additional application module; and allocating a second availability of required resources for the additional application module.

12. The system of claim 11, wherein the additional application module includes a specific activity in the workflow, and wherein the processor is further configured to perform operations comprising:
   shutting down the additional application module after the specific activity in the workflow is complete.

13. The system of claim 11, the processor being further configured to perform operations comprising:
   identifying that a datacenter for running the application module and the additional application module is operating using backup power; and
   transferring, physically, modules of the datacenter in proximity to each other, wherein the application module and the additional application module are being processed on the modules of the datacenter.

14. A computer program product comprising a computer readable storage medium having program instructions embodied therewith, the program instructions executable by a processor to cause the processor to perform operations, the operations comprising:
   analyzing, using an AI system, an application, wherein the application includes one or more application modules;
   determining, using the AI system, that an application module is critical based on a contextual scenario, wherein the AI system is trained utilizing data regarding heat generation of hardware on which the application module is operating;
   identifying, using the AI system, required resources for the hardware for the application module to function during the contextual scenario; and
   allocating an availability of the required resources for the application module.

15. The computer program product of claim 14, wherein determining that the application module is critical based on the contextual scenario includes:
   identifying, during the contextual scenario, each of the one or more application modules that are accessed; and
   identifying that the application module was accessed more than an access threshold amount.

16. The computer program product of claim 15, wherein allocating an availability of the required resources for the application module includes:
   identifying a second critical application module; and
   ranking a priority of the second critical application module above a priority of the application module.

17. The computer program product of claim 14, the operations further comprising:
   detecting a workflow of the application;
   identifying, from the detecting, an additional application module in the workflow;
   identifying required resources for the additional application module; and
   allocating a second availability of required resources for the additional application module.

18. The computer program product of claim 17, wherein the additional application module includes a specific activity in the workflow, and wherein the operations further comprise:
   shutting down the additional application module after the specific activity in the workflow is complete.

19. The computer program product of claim 17, the operations further comprising:
   identifying that a datacenter for running the application module and the additional application module is operating using backup power; and
   transferring, physically, modules of the datacenter in proximity to each other, wherein the application module and the additional application module are being processed on the modules of the datacenter.

20. The computer program product of claim 19, the operations further comprising:
   predicting a duration of use of the backup power.

* * * * *